Patented Feb. 7, 1939

2,146,282

UNITED STATES PATENT OFFICE 2,146,282

PROCESS FOR PRODUCING ACRYLIC ACID

Herbert Berg and Franz Leiss, Burghausen, Germany, assignors to Dr. Alexander Wacker Gesellschaft für Elektrochemische Industrie, G. m. b. H., Munich, Bavaria, Germany, a corporation of Germany No Drawing. Application October 17, 1936, Serial No. 106,188. In Germany October 28, 1935

7 Claims. (Cl. 260—526)

This invention relates to the production of acrylic acid and has for its object to provide a simple and efficient process for that purpose.

It is known that methyl vinyl ketone polymerizes very quickly in the presence of alkalis, so it could not be expected to form homogeneous compounds when subjected to the action of alkali-like reacting substances.

Contrary to expectation, we have found that fluid methyl xinyl ketone may be oxidized with satisfactory results to acrylic acid by means of hypohalogenites, for example alkali metal hypochlorite, the trihalogen substitution compounds of methane forming in corresponding quantity.

As an illustration of such process, we dilute methyl vinyl ketone with water or another solvent or mix with a non-solvent, and then, while stirring, an aqueous solution or suspension of a suitable hypohalogenite is allowed to drip into the methyl vinyl ketone solution. During the operation of the process excessive heating of the reaction mixture is avoided by cooling in any suitable manner. The chloroform generated in the reaction, for instance when hypochlorite of potassium is used, collects on the bottom of the reaction vessel; the aqueous layer is mixed with acid to the point of reaching a weak alkaline reaction, boiled down, acidified, and then extracted with ether. Surprisingly, under these conditions the resulting acrylic acid does not polymerize to any appreciable extent and hence it may be further treated or utilized without appreciable losses.

The acrylic acid produced in accordance with our invention can be polymerized, for example in the form of its esters, and used for the preparation of artificial products such as artificial resins and the like.

The invention claimed is:

1. Process for producing acrylic acid which comprises diluting methyl vinyl ketone with a solvent which is inert thereto, and then reacting same with a hypohalogenite.

2. Process for producing acrylic acid which comprises reacting an aqueous solution of methyl vinyl ketone with alkali metal hypochlorite.

3. Process for producing acrylic acid which comprises reacting an emulsion of methyl vinyl ketone and an inert nonsolvent with a hypochlorite.

4. Process for producing acrylic acid which comprises dissolving methyl vinyl ketone in a solvent in which said methyl vinyl ketone is not dissociated, and then reacting same with an alkali metal hypochlorite.

5. Process for producing acrylic acid which comprises reacting an emulsion of methyl vinyl ketone and an inert nonsolvent with alkali metal hypochlorite.

6. Process for producing acrylic acid which comprises preparing a solution of methyl vinyl ketone and a liquid which is inert thereto, and then gradually adding to said solution small amounts of a hypohalogenite while stirring and cooling the mixture.

7. Process for preducing acrylic acid which comprises diluting methyl vinyl ketone in an inert liquid carrier, and then reacting same while in such dilute state with a hypohalogenite.

HERBERT BERG.
FRANZ LEISS.